United States Patent Office 2,717,208
Patented Sept. 6, 1955

2,717,208

METHOD OF ACCELERATING THE GROWTH OF CHICKS

Charles M. Ely, Springdale, Ohio, assignor to National Distillers Products Corp., a corporation of Virginia No Drawing. Application April 9, 1952,
Serial No. 281,483

2 Claims. (Cl. 99—4)

This invention is a new and useful method of accelerating the growth of chicks. I have discovered that the growth of chicks is accelerated by admixing with the total intake the amide of a fatty acid of from 8–18 carbon atoms. In the course of numerous experiments I have demonstrated that by the addition to the diet of chicks of from .05–.25% based on the total amount of solid food supplied, air dry basis, I am able to accelerate the growth by several percent.

In one specific experiment in which chicks were fed on a diet containing .055% of the amide of lauric acid, the actual increase in growth based on a final weighing at the age of 70 days as compared to a similar group of chicks fed under identical conditions except for the omission of the lauric acid amide, was 2.4%.

The amount to be added is predicated on the amount of solid food supplied, air dry basis. The actual introduction may be in admixture with such foods supplied to the chicks. The actual food efficiency, i. e., the gain in weight in relation to the total amount of food consumed, does not appear to be affected by the introduction specified. The primary advantage is therefore that a greater output is obtainable in unit time from a single installation and since the chicks will be on the average somewhat larger, the ratio of fat and muscle tissue to bone and offal, is greater.

I claim:

1. Method of accelerating the growth of chicks which comprises introducing into the solid food consumed by such chicks from .05–.25% of the amide of a fatty acid of from 8–18 carbon atoms based on the amount of solid foods, air dry basis, supplied.

2. Method of accelerating the growth of chicks which comprises introducing into the solid food consumed by such chicks from .05–.25% of lauric acid amide based on the amount of solid foods, air dry basis, supplied.

References Cited in the file of this patent

Chem. Abst. 32, 50384 (1938) which is an abstract of Carstens et al., Zuchtungskunde 13, 109–19 (1938). (Carstens et al. available at Dept. of Agr.)